UNITED STATES PATENT OFFICE 2,593,314

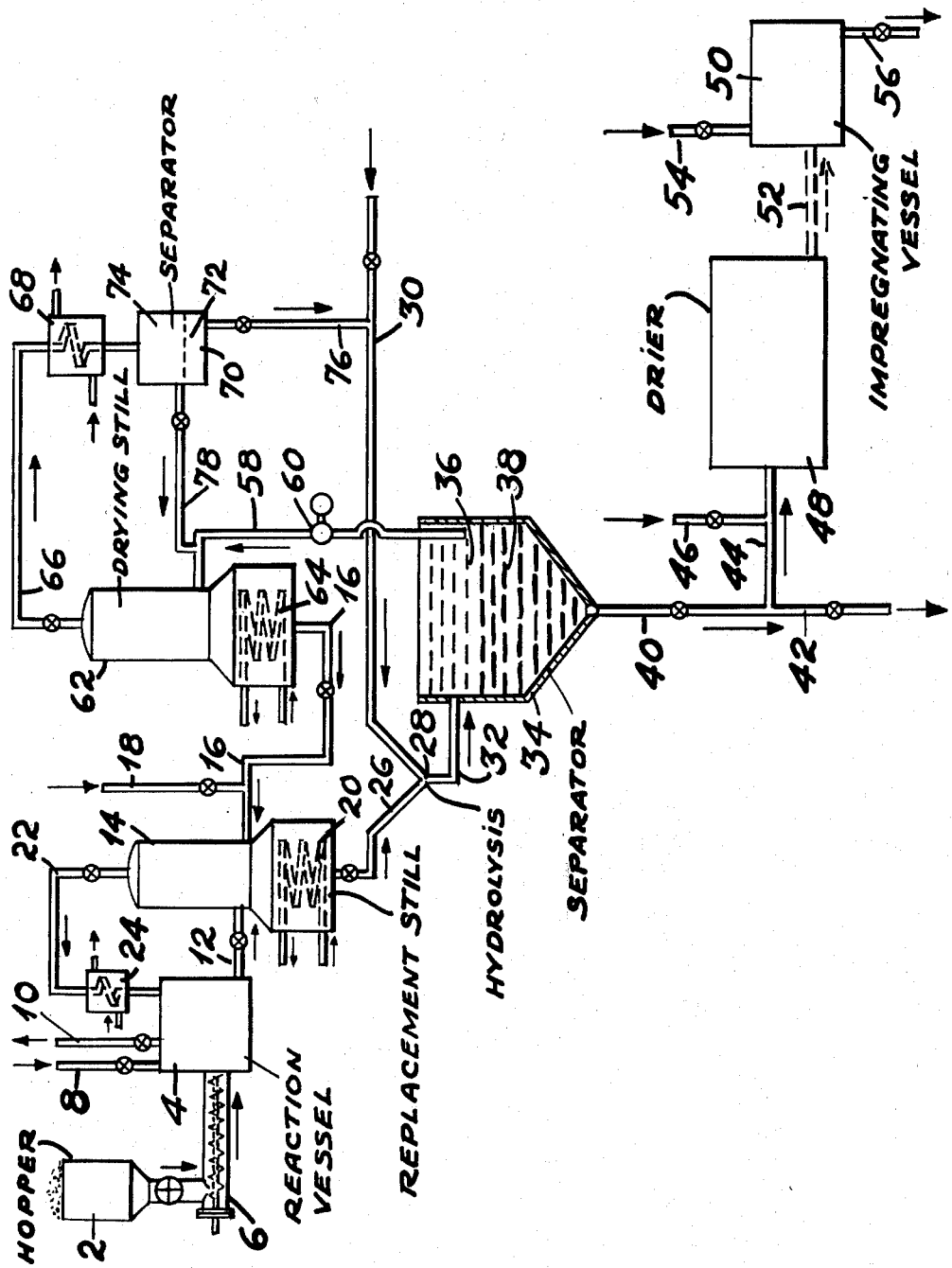

PROCESS FOR PRODUCING MAGNESIA

Charles N. Kimberlin, Jr., Baton Rouge, La., assignor to Standard Oil Development Company, a corporation of Delaware Application March 15, 1949, Serial No. 81,594

10 Claims. (Cl. 23—201)

This invention relates to a process for the preparation of catalytic and adsorbent materials and more particularly to a process for the preparation of magnesia and magnesia containing catalysts and adsorbent materials.

The use of magnesia and magnesia containing materials is well known. These substances may be made by mixing powdered magnesium oxide, which has been prepared by calcining magnesium carbonate, with other materials such as silica, alumina, silica-alumina and the like.

It is the object of this invention to provide a new process for the preparation of magnesia and/or magnesia containing catalysts and adsorbent materials by the hydrolysis of an alcoholate of magnesium and recovering the alcohol for reuse by decanting a separated liquid phase.

Factors which contribute to the commercial practicability of this invention include:

(1) The low cost of magnesium metal as a source of magnesia;

(2) The elimination of all necessity for washing;

(3) The simplicity of the processing steps involved in the manufacture; and (4) The use of a substantially water insoluble alcohol to insure substantially complete alcohol recovery.

The material prepared in accordance with this method is characterized by high purity and high surface area.

Magnesium metal reacts readily only with the lower, water soluble alcohols such as methyl or ethyl alcohol. If the alcoholate of magnesium formed with these alcohols is hydrolyzed, the reformed or regenerated alcohols are very difficult to separate and dry for reuse. This difficulty is avoided in the present process by treating the magnesium alcoholate derived from a water soluble alcohol with a substantially water insoluble alcohol which may contain a hydrocarbon diluent. The water soluble alcohol radical is displaced from the magnesium alcoholate and the water insoluble alcohol radical is substituted for it. The water soluble alcohol thus reformed is distilled out of the mixture and is recovered dry and ready for reuse. The remaining magnesium alcoholate is then hydrolyzed with an excess of water or other aqueous medium forming hydrous magnesia and regenerating the water insoluble alcohol. The hydrous magnesia forms a slurry with the excess of water from the hydrolyzing medium. The alcohol which is reformed or regenerated by the hydrolysis step, together with any hydrocarbon diluent separates readily from the slurry of water and hydrous magnesia and is easily removed and recovered by a simple process of decanting or the like. The slurry of hydrous magnesia is removed for further treatment.

According to this invention, the alcohol used for the formation of the magnesium alcoholate is any of the aliphatic alcohols of the general formula $C_nH_{2n+1}OH$ where "$n$" is 2 or less but alcohols where "$n$" is 1 is preferred. The alcohol chosen must be essentially anhydrous and the commercial anhydrous methyl alcohol is satisfactory.

For the replacing alcohol, that is, the water insoluble alcohol which is used to replace the water soluble alcohol radical from the magnesium alcoholate, an aliphatic alcohol of the general formula $C_nH_{2n+1}OH$ where "$n$" is 4 or greater may be used but the alcohols where "$n$" is 5 or greater are preferred. The $C_5$ and higher alcohols are less soluble in water than the $C_4$ alcohols and are therefore preferred in this process. The $C_4$ alcohols have a solubility in water under standard conditions of 9 or more grams per 100 cc. of water whereas the $C_5$ and higher alcohols (except tertiary amyl alcohol) have a solubility in water under standard conditions of about 5.3 or less grams per 100 cc. of water. For this invention, the maximum allowable solubility of the alcohol in water under standard conditions is about 15 grams of alcohol per 100 cc. of water but the preferred maximum solubility of the alcohol in water under standard conditions is about 5.3 grams or less of alcohol per 100 cc. of water.

The alcohols which may be used as replacing alcohols in this process include n-butyl alcohol, secondary butyl alcohol, isobutyl alcohol but while, as pointed out above, these alcohols are operable, they are much less satisfactory and the following higher molecular weight alcohols are preferred: pentanol-1, pentanol-2, 2 methyl butanol-4, 2 methyl butanol-3, pentanol-3, hexanol-1, hexanol-2, hexanol-3, the various methyl pentanols, the various dimethyl butanols, the various heptyl alcohols, the various octyl alcohols, etc. including those alcohols substantially insoluble in water and liquid at the temperature of operation of the process.

Instead of using any one of the alcohols singly as a displacing alcohol, mixed alcohols such as mixed amyl alcohols may be used. Mixtures of alcohols of different molecular weights may be used.

In order to further facilitate the separation of the alcohol from the water, and in the preferred form of this invention, a hydrocarbon, such as a petroleum distillate boiling within the range of 200° F. to 500° F. or higher and preferably in the range of 300° F. to 400° F. is added to the alcohol. Although the addition of the hydrocarbon is not necessary to the process, the use of the hydrocarbon diluent is preferred and has the following advantages:

1. The hydrocarbon serves as a solvent for the solid magnesium alcoholate; and
2. The hydrocarbon diluent greatly aids in the separation and recovery of the alcohol from the hydrous magnesia slurry after hydrolysis.

The formation of the alcoholate of magnesium using methyl alcohol as the reactant alcohol takes place in accordance with the following equation:

EQUATION I $$2CH_3OH + Mg \rightarrow Mg(OCH_3)_2 + H_2$$

The hydrogen is in the gaseous state and escapes from the reaction.

The replacement step using amyl alcohol as the replacement alcohol proceeds as follows:

EQUATION II $$Mg(OCH_3)_2 + 2C_5H_{11}OH \rightarrow Mg(OC_5H_{11})_2 + 2CH_3OH$$

The reformed or regenerated methyl alcohol is removed from the reaction products by distillation.

Upon hydrolysis, the magnesium alcoholate undergoes the following change:

EQUATION III $$Mg(OC_5H_{11})_2 + 2H_2O \rightarrow Mg(OH)_2 + 2C_5H_{11}OH$$

the replacing alcohol being reformed and going into solution again with the hydrocarbon diluent.

The alcohol-hydrocarbon mixture contains a small amount of residual water as entrained and dissolved water and is freed from this residual water by a simple process of distillation for reuse in the process. The overhead gases from the drying still are condensed, the condensate allowed to settle, and upon settling, separates into a water layer and an alcohol-hydrocarbon layer, the latter being recycled to the drying still. The dried alcohol-hydrocarbon mixture is removed from the bottom of the drying still and is ready for further use in the replacement step.

In the drawing, the figure represents one form of an apparatus suitable for carrying out one embodiment of this invention.

Referring to the drawing, numeral 2 designates a storage hopper for metallic magnesium. This magnesium metal may be in the form of magnesium chips, turnings or the like. Alloys of magnesium can be used but they are undesirable because they react much more slowly than magnesium metal uncombined. The magnesium metal is charged into reaction vessel 4 by means of screw conveyor 6. Reaction vessel 4 is adapted to contain the reactants, metallic magnesium and a lower water soluble alcohol such as methyl or ethyl alcohol. The reaction vessel is equipped with an inlet pipe 8 for the addition of make up methyl or ethyl alcohol, some portion of the alcohol being used up or lost in the process. The amount of alcohol added through inlet pipe 8 varies with the conditions of the process but is usually between 0.5% and 1.5% of the circulating methyl alcohol stream. The reaction vessel is also equipped with an exit line 10 for removing gaseous products, including hydrogen, from the reaction, the reaction occurring in accordance with Equation I. The hydrogen produced is equivalent in purity to that produced electrically. It may be cooled and passed through a separator which strips from it any entrained liquid, the liquid being returned to reaction vessel 4 and the hydrogen filtered, compressed and stored by means of equipment not shown.

The reaction of the magnesium metal with the methyl alcohol in vessel 4 may be carried out in the presence of a promoter or catalyst, such as a small amount of mercuric chloride, aluminum chloride, iodine or the like. Ordinarily, however, no promoter is needed for the reaction proceeds to completion readily without one. The temperature in reaction vessel 4 will approximate the boiling point of the reactant alcohol used. When methanol is used, for example, the temperature in reaction vessel 4 will be approximately 150° F.

Temperature controlling means such as a cooling coil, not shown, may be contained in reactor vessel 4 to control the rate of reaction and prevent boiling up of the reactant alcohol.

From reaction vessel 4 the products of the reaction comprising a solution of magnesium alcoholate in excess alcohol are passed through line 12 and into replacement still 14. In the replacement still 14, the magnesium alcoholate is treated with a substantially water insoluble alcohol. This treatment, which consists of the replacement step, takes place in accordance with Equation II.

The water insoluble alcohol enters the replacement still 14 through line 16. Line 16 carries the substantially water insoluble alcohol from a drying still, hereinafter to be described, to the replacement still 14. Line 16 is equipped with line 18 for the introduction of additional water insoluble alcohol to the circulating stream. This additional water insoluble alcohol is added to make up operating losses which vary with efficiency of operation. This would be expected to be in the order of from 0.5% to 1.5% of the circulating water insoluble alcohol stream under normally efficient operation.

Replacement still 14 at atmospheric pressure is heated to a temperature within the range of 230° to 280° F., depending upon the boiling point of the replacing alcohol. At these temperatures the lower water soluble alcohol is vaporized and is removed as vapor through line 22, condensed in condenser 24, and returned to reactor vessel 4. The temperature at the top of replacement still 14 will be about 150 to 160° F.

The substituted magnesium alcoholate collects at the bottom of replacement still 14 and is removed through line 26 to a hydrolysis zone 28. Water or other aqueous medium is simultaneously injected into hydrolysis zone 28 through line 30. In this hydrolysis zone 28, which may be a two fluid nozzle, a centrifugal pump, or any other device for simultaneously contacting two fluids each with the other, the magnesium alcoholate is hydrolyzed forming hydrous magnesia and regenerating the substantially water insoluble alcohol in accordance with Equation III. The temperature in hydrolysis zone 28 is not critical but may be between 100 and 200° F.

From the hydrolyzing zone 28, the mixture of hydrocarbon, regenerated alcohol, water and hydrous magnesia is passed through line 32 to separating vessel 34. Here the mixture may be allowed to remain substantially quiescent for a period of about 1 to 10 hours but very slow stirring aids the separation. The mixture separates into two distinct layers, the upper alcohol and hydrocarbon layer as shown at 36 and the lower water layer containing hydrous magnesia in the form of a slurry as shown at 38. The vessel 34 and its contents should be maintained at a temperature or about 70° to 200° F. preferably 150° to 180° F. since settling seems to be somewhat better in this range. The water or aqueous solution added to the hydrolyzing zone 28 through line 30 should be in such amounts so as to give about 3 to 5% slurry of hydrous magnesia in the aqueous layer. For example, for each 100 grams of magnesium metal used about 3 to 6 liters of water or aqueous solution should be used. This slurry is readily concentrated to as high as 10% solids content by continued settling.

The slurry of hydrous magnesia is withdrawn from the bottom of settling tank 34 through line 40. It may be passed from line 40 through line 42 to another settling chamber, not shown, to concentrate the slurry further. Water is withdrawn off the top of the settled slurry and reused in the hydrolysis step to recover any suspended hydrous magnesia it may contain. The concentrated slurry may then be passed to a dryer presently to be described. The slurry without further concentration may also be passed from line 40 into line 44. If it is desired, the slurry in line 44 may be impregnated or mixed with another catalytic component by introducing a solution of such catalytic component through line 46 to line 44 leading to dryer 48. The impregnated slurry may then be dried in dryer 48.

However, if a magnesia gel is desired, the slurry either with or without further concentration may be passed directly into dryer 48. The drying temperature in drying chamber 48 may vary between 220° and 500° F. depending upon the catalytic material treated and the results desired. After being dried the magnesia gel may be removed from the dryer 48 by means of line 49.

If it is desired, the dried magnesia may be impregnated with another catalytic material in vessel 50. In this case, the dried magnesia is transferred from dryer 48 to vessel 50 by a screw conveyor or other means identified by reference character 52. A solution of the desired catalytic component may be introduced into vessel 50 through line 54. After a sufficient contacting period, the impregnated catalytic material and excess impregnating solution may be withdrawn through line 56 for further treatment in equipment not shown.

The alcohol-hydrocarbon mixture in layer 36 of settling tank 34 is withdrawn through line 58 by means of pump 60 to a drying still 62 where any dissolved or entrained water is removed by a simple distillation. Heat for the distillation is furnished by coil 64 but any other method of supplying heat to raise the distillation apparatus to the desired temperature may be used. For a 50-50% volume mixture of amyl alcohol and a hydrocarbon diluent boiling within a range of 300 to 400° F. this temperature will be about 250° F. to 280° F. The vaporized water which carries with it some small portion of the hydrocarbon-alcohol mixture passes from the top of drying still 62 through line 66 and then through condensing coil 68 into separator 70. Gravity separation takes place in separator 70 forming a bottom water layer 72 and a top alcohol layer 74. The water is withdrawn from separator 70 through line 76 and is passed to line 30 for reuse in the hydrolysis step. Any alcohol and/or hydrocarbon dissolved in the water is returned to the system with the water.

The alcohol-hydrocarbon layer in separator 70 passes through line 78 and into line 58 where it is reintroduced into drying still 62.

The alcohol-hydrocarbon mixture that has been substantially completely freed of any dissolved or entrained water by drying still 62 is passed through line 16 and into replacement still 14. The temperature of the mixture in line 16 will be at the boiling temperature of the mixture being used.

The invention is further described and illustrated by the following examples.

*Example 1*

384 g. magnesium turnings were dissolved in 8 liters of anhydrous methyl alcohol. Cooling by an internal coil was necessary during the course of most of the reaction. To the solution of magnesium methylate was added 8 liters of amyl alcohol and 8 liters of Varsol (a hydrocarbon boiling between 300–400° F.). The methyl alcohol was then distilled off. The solution of magnesium amylate in excess amyl alcohol and Varsol was hydrolyzed by mixing with 16 liters of water. The layer of Varsol and regenerated amyl alcohol was decanted and dried for further use by distilling out the small amount of dissolved and suspended water. The slurry of hydrous magnesia was dried in an oven heated at 250° F. The product was a magnesia gel having a surface area of approximately 500 square meters per gram. It is useful as an adsorbent or as a catalyst base.

*Example 2*

384 g. of magnesium turnings were dissolved in 8 liters of anhydrous methyl alcohol, cooling by an internal coil was necessary during the course of most of the reaction. To the solution of magnesium methylate was added 8 liters of amyl alcohol and 8 liters of a hydrocarbon diluent boiling between 300 to 400° F. From this mixture methyl alcohol was distilled off. The solution of magnesium alcoholate in excess amyl alcohol and hydrocarbon diluent was hydrolyzed by mixing with 16 liters of water. The layer of hydracorbon diluent in regenerated amyl alcohol was decanted and dried for further use by distilling out the small amount of dissolved and suspended water.

To the magnesium slurry was added 86.6 g. of ammonium molybdate (82% molybdenum oxide) which was dissolved in one liter of water. The mxture was dried in an oven, heated to 250° F. and activated by heating to 850° F. This catalyst comprised approximately 90% magnesium oxide and 10% molybdenum oxide and is useful for the treatment or hydroforming of naphtha in the presence of hydrogen for improving the octane number of the naphtha.

*Example 3*

The magnesia slurry was prepared exactly as in Example 2. To this was added a solution of 118 g. of ammonium dichromate in one liter of water. The mixture was dried in an oven at 250° F., and activated by heating at 850° F. This catalyst comprised approximately 90% magnesium oxide and 10% chromium oxide. It is useful for improving the octane number of naphtha.

Although it is not necessary to use a promoter to catalyze the reaction between magnesia metal and the water soluble alcohol, it may be advantageous under certain conditions to use a promoter such as small amounts of mercury, mercuric chloride, and the like. Ordinarily, the amount of mercury will be within a range of from 0.05 to 0.5 weight per cent based on the magnesium metal. When only a small amount of magnesia is to be made, it may not be worth while to recover this mercury. However, when large quantities of magnesia are to be made, the total amount of mercury used becomes considerable. Also there is a safety hazard from mercury vapors arising from the drying and calcining of the magnesia catalyst where the mercury is not first separated.

This mercury is easily recovered by contacting the solution of magnesium containing the mercury which is in the form of a colloidal dispersion with a metal such as copper or silver which readily forms an amalgam with mercury but which is non-reactive with alcohol.

This contacting is done prior to the hydrolysis step. The metal may be supported on a carrier such as pumice, silica gel, alumina or other porous materials so that a high surface area will be presented. The metal readily absorbs the suspended mercury leaving the alcoholate solution virtually free of mercury.

After the metal has absorbed the mercury to a point where its efficiency for further absorption is reduced, the mercury is recovered from the amalgam by heating thus leaving the metal in a condition suitable for reuse.

The recovered mercury may likewise be reused for the reaction of magnesium with alcohol. The temperature at which it is necessary to heat the amalgam in order to distill off the mercury will vary according to the metal that was employed and also according to the residual amount of mercury which it is considered permissible to leave associated with the metal for reuse. In general, it will not be necessary to completely free the metal of mercury before it is reused. In any case a temperature higher than 1000° F. should not be necessary for this distillation.

What is claimed is:

1. A process for producing magnesia which comprises reacting a substantially anhydrous and water soluble lower aliphatic alcohol with magnesium metal to form magnesium alcoholate, treating the resultant magnesium alcoholate with a substantially water insoluble higher aliphatic alcohol, hydrolyzing the resultant substituted magnesium alcoholate with an aqueous medium to form a hydrous magnesia and a separate layer comprising water insoluble alcohol, separating the regenerated water insoluble alcohol from said hydrous magnesia and recovering the hydrous magnesia so formed.

2. A process for producing magnesia which comprises reacting a substantially anhydrous water soluble lower aliphatic alcohol with metallic magnesium to form magnesium alcoholate, treating the magnesium alcoholate so formed with a mixture of a substantially water insoluble higher aliphatic alcohol and a petroleum distillate, hydrolyzing the substituted magnesium alcoholate so formed, separating the aqueous phase from the mixture of regenerated alcohol-petroleum distillate and recovering the hydrous magnesia.

3. A process according to claim 2 in which the substantially water insoluble alcohol is amyl alcohol.

4. A process according to claim 2 in which the substantially anhydrous water soluble lower aliphatic alcohol is methyl alcohol.

5. The process according to claim 2 in which the substantially water insoluble alcohol is an alcohol containing 4 or more carbon atoms and has a solubility in water of less than about 15 grams per 100 cc. under standard conditions.

6. The process for producing magnesia which comprises reacting metallic magnesium with a substantially anhydrous water soluble lower aliphatic alcohol, treating the magnesium alcoholate so formed with a mixture comprising a substantially water insoluble higher aliphatic alcohol and a petroleum distillate, hydrolyzing the resultant substituted magnesium alcoholate with an aqueous medium, allowing the regenerated alcohol-petroleum distillate to separate from the hydrous magnesia in a settling zone, passing the regenerated alcohol-petroleum distillate mixture to a drying zone, drying of regenerated alcohol-petroleum distillate mixture, condensing the overhead fraction from the drying zone and passing it to a separation zone, allowing the said condensate to separate into a water layer and a regenerated alcohol-petroleum distillate layer in said separation zone, returning the dried regenerated alcohol-petroleum distillate mixture to the process and removing the hydrous magnesia from said settling zone to a drying zone and drying the hydrous magnesia.

7. A process for producing magnesia containing substances which comprises reacting metallic magnesium with a substantially anhydrous water soluble lower aliphatic alcohol, treating the magnesium alcoholate so formed with a substantially water insoluble higher aliphatic alcohol to form a substituted magnesium alcoholate, hydrolyzing the substituted magnesium alcoholate to form hydrous magnesia and water insoluble alccohol, allowing the water insoluble alcohol to separate from the hydrous magnesia as a separate layer, drying the last mentioned layer, returning said treated alcohol to the process and recovering hydrous magnesia from the reaction.

8. A process for producing magnesia containing substances which comprises reacting metallic magnesium with a substantially anhydrous water soluble lower aliphatic alcohol, treating the magnesium alcoholate so formed with a substantially water insoluble high aliphatic alcohol to form a substituted magnesium alcoholate, hydrolyzing the substituted magnesium alcoholate to form hydrous magnesia and water insoluble alcohol, separating the water insoluble alcohol and recovering hydrous magnesia.

9. A process for producing magnesia which comprises reacting a substantially anhydrous water soluble lower aliphatic alcohol with metallic magnesium to magnesium alcoholate, treating the magnesium alcoholate so formed with a mixture of a substantially water insoluble higher aliphatic alcohol and petroleum distillate so that the water soluble alcohol is displaced from the magnesium alcoholate by the water insoluble alcohol, recovering the displaced water soluble alcohol, hydrolyzing the substituted magnesium alcoholate so formed, separating the aqueous phase from the regenerated alcohol-petroleum distillate mixture and recovering the hydrous magnesia.

10. The process for producing magnesia which comprises reacting metallic magnesium with a substantially anhydrous water soluble lower aliphatic alcohol, treating the magnesium alcoholate so formed with a mixture comprising a substantially water insoluble higher aliphatic alcohol and a petroleum distillate under conditions such that the water soluble alcohol is displaced from the magnesium alcoholate and the water insoluble alcohol is substituted therefor, recovering the displaced water soluble alcohol, hydrolyzing the resultant substituted magnesium alcoholate with an aqueous medium, allowing the regenerated alcohol-petroleum distillate to separate from the hydrous magnesia in a second zone, separating the regenerated alcohol-petroleum distillate and passing it to a drying zone, drying the regenerated alcohol-petroleum distillate, condensing the overhead fraction from the drying zone and passing it into a separation zone, allowing the said condensate to separate into a water layer and a regenerated alcohol-petroleum distillate layer in said separation zone, returning the dried, regenerated alcohol-petroleum distillate to the process and removing the hydrous magnesia from said settling zone to a drying zone and drying the hydrous magnesia.

CHARLES N. KIMBERLIN, Jr.

REFERENCES CITED

The following references are of record in the file of this patent:

UNITED STATES PATENTS

| Number | Name | Date |
|---|---|---|
| 2,069,404 | Cunningham | Feb. 2, 1937 |
| 2,234,267 | Chesny | Mar. 11, 1941 |
| 2,287,088 | Cohen | June 23, 1942 |
| 2,491,033 | Byrns et al. | Dec. 13, 1949 |

FOREIGN PATENTS

| Number | Country | Date |
|---|---|---|
| 490,388 | Great Britain | Aug. 15, 1938 |

OTHER REFERENCES

"Organic Chemistry" by Whitmore, 4th edition, D. Van Nostrand Co., Inc., New York (1937) p. 105.